US009141583B2

(12) United States Patent
Prakah-Asante et al.

(10) Patent No.: US 9,141,583 B2

(45) Date of Patent: Sep. 22, 2015

(54) METHOD AND SYSTEM FOR SUPERVISING INFORMATION COMMUNICATION BASED ON OCCUPANT AND VEHICLE ENVIRONMENT

(71) Applicant: Ford Global Technologies, LLC, Dearborn, MI (US)

(72) Inventors: Kwaku O. Prakah-Asante, Commerce Township, MI (US); Doron M. Elliott, Detroit, MI (US); Gary Steven Strumolo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 12 days.

(21) Appl. No.: 13/798,658

(22) Filed: Mar. 13, 2013

(65) Prior Publication Data

US 2014/0277932 A1 Sep. 18, 2014

(51) Int. Cl.

| | |
|---|---|
| ***B60K 28/02*** | (2006.01) |
| ***G06F 17/00*** | (2006.01) |
| ***B60R 11/00*** | (2006.01) |
| ***H04M 1/60*** | (2006.01) |
| *H04M 1/725* | (2006.01) |

(52) U.S. Cl.

CPC ................ *G06F 17/00* (2013.01); *B60K 28/02* (2013.01); *B60R 11/00* (2013.01); *H04M 1/6091* (2013.01); *H04M 1/72577* (2013.01); *H04M 2250/02* (2013.01)

(58) Field of Classification Search

CPC ..... H04M 3/436; H04M 3/4365; H04W 4/12; H04W 4/16; H04W 4/025; H04W 4/027; H04W 4/04

USPC .................. 701/1, 36, 37, 41, 45, 48, 49, 70; 370/241, 252, 259; 340/425.5, 426.17, 340/426.2, 438, 459–467; 455/418, 456.1, 455/466

See application file for complete search history.

(56) References Cited

U.S. PATENT DOCUMENTS

| | | | |
|---|---|---|---|
| 4,543,569 | A | 9/1985 | Karlstrom |
| 5,081,667 | A | 1/1992 | Drori et al. |

(Continued)

FOREIGN PATENT DOCUMENTS

| | | |
|---|---|---|
| CN | 1863052 | 11/2006 |
| CN | 101596895 | 12/2009 |

(Continued)

OTHER PUBLICATIONS

Autobiometrics, Com, US Distributor for ATRD Biometric Immobilizer, http://www.autobiometrics.com, Jul. 6, 2011.

(Continued)

*Primary Examiner* — Thomas Tarcza
*Assistant Examiner* — Tyler J Lee
(74) *Attorney, Agent, or Firm* — Jennifer M. Stec; Brooks Kushman P.C.

(57) ABSTRACT

A vehicle computer system includes one or more processors configured to receive context data representative of a vehicle's environment from one or more modules. The one or more processors are programmed and configured to receive the context data from one or more modules, determine an attention demand value utilizing the context data and a workload value corresponding to the context data, and output an indicator to activate or adjust a do not disturb feature based on the attention demand value.

20 Claims, 8 Drawing Sheets

(56) References Cited

U.S. PATENT DOCUMENTS 5,467,070 A 11/1995 Drori et al.
5,513,107 A 4/1996 Gormley
5,627,510 A 5/1997 Yuan
5,635,916 A 6/1997 Bucholtz et al.
5,655,081 A 8/1997 Bonnell et al.
5,734,336 A 3/1998 Smithline
5,776,031 A 7/1998 Minowa et al.
5,828,319 A 10/1998 Tonkin et al.
5,874,889 A 2/1999 Higdon et al.
5,959,540 A 9/1999 Walter
6,018,291 A 1/2000 Marble et al.
6,133,825 A 10/2000 Matsuoka
6,177,866 B1 1/2001 O'Connell
6,188,315 B1 * 2/2001 Herbert et al. ................ 340/438
6,198,996 B1 3/2001 Berstis
6,263,282 B1 7/2001 Vallancourt
6,268,804 B1 7/2001 Janky et al.
6,271,745 B1 8/2001 Anzai et al.
6,282,226 B1 8/2001 Furukawa
6,434,455 B1 8/2002 Snow et al.
6,434,486 B1 8/2002 Studt et al.
6,438,491 B1 8/2002 Farmer
6,539,078 B1 3/2003 Hunt et al.
6,574,734 B1 6/2003 Colson et al.
6,590,495 B1 7/2003 Behbehani
6,668,221 B2 12/2003 Harter, Jr. et al.
6,679,702 B1 1/2004 Rau
6,690,260 B1 2/2004 Ashihara
6,731,925 B2 * 5/2004 Naboulsi ....................... 455/345
6,737,963 B2 5/2004 Gutta et al.
6,754,562 B2 6/2004 Strege et al.
6,785,542 B1 8/2004 Blight et al.
6,810,309 B2 10/2004 Sadler et al.
6,853,919 B2 2/2005 Kellum
6,859,718 B2 2/2005 Fritz et al.
6,871,145 B2 3/2005 Altan et al.
6,906,619 B2 6/2005 Williams et al.
6,941,194 B1 9/2005 Dauner et al.
6,974,414 B2 * 12/2005 Victor ........................... 600/300
7,057,501 B1 6/2006 Davis
7,075,409 B2 7/2006 Guba
7,102,496 B1 9/2006 Ernst, Jr. et al.
7,124,027 B1 10/2006 Ernst, Jr. et al.
7,148,790 B2 12/2006 Aoyama et al.
7,161,563 B2 1/2007 Vitale et al.
7,173,903 B2 2/2007 Remboski et al.
7,194,069 B1 3/2007 Jones et al.
7,207,041 B2 4/2007 Elson et al.
7,228,213 B2 6/2007 Sakai et al.
7,246,062 B2 7/2007 Knott et al.
7,266,438 B2 9/2007 Kellum et al.
7,292,152 B2 * 11/2007 Torkkola et al. .............. 340/576
7,337,113 B2 2/2008 Nakagawa et al.
7,340,332 B2 3/2008 Underdahl et al.
7,356,394 B2 4/2008 Burgess
7,366,892 B2 4/2008 Spaur et al.
7,375,620 B2 5/2008 Balbale et al.
7,391,305 B2 6/2008 Knoll et al.
7,484,008 B1 1/2009 Gelvin et al.
7,565,230 B2 7/2009 Gardner et al.
7,602,782 B2 10/2009 Doviak et al.
7,783,475 B2 8/2010 Neuberger et al.
7,812,712 B2 10/2010 White et al.
7,826,945 B2 11/2010 Zhang et al.
8,050,817 B2 11/2011 Moinzadeh
8,050,863 B2 11/2011 Trepagnier et al.
8,089,339 B2 1/2012 Mikan et al.
8,232,864 B2 7/2012 Kakiwaki
8,237,554 B2 8/2012 Miller et al.
8,258,939 B2 9/2012 Miller et al.
8,301,108 B2 10/2012 Naboulsi
8,305,189 B2 11/2012 Miller et al.
8,311,722 B2 11/2012 Zhang et al.
8,559,932 B2 * 10/2013 Elliott et al. .................. 455/418
8,644,165 B2 * 2/2014 Saarimaki et al. ............ 370/241
2001/0021891 A1 9/2001 Kusafuka et al.
2002/0013650 A1 1/2002 Kusafuka et al.
2002/0031228 A1 3/2002 Karkas et al.
2002/0096572 A1 7/2002 Chene et al.
2002/0097145 A1 7/2002 Tumey et al.
2003/0004730 A1 1/2003 Yuschik
2003/0055643 A1 3/2003 Woestemeyer et al.
2003/0079123 A1 4/2003 Mas Ribes
2003/0217148 A1 11/2003 Mullen et al.
2003/0220725 A1 11/2003 Harter, Jr. et al.
2003/0231550 A1 12/2003 Macfarlane
2004/0046452 A1 3/2004 Suyama et al.
2004/0073367 A1 4/2004 Altan et al.
2004/0088084 A1 * 5/2004 Geisler et al. ..................... 701/1
2004/0088205 A1 * 5/2004 Geisler et al. ..................... 705/7
2004/0124968 A1 7/2004 Inada et al.
2004/0176906 A1 9/2004 Matsubara et al.
2004/0227642 A1 11/2004 Giles et al.
2004/0236475 A1 11/2004 Chowdhary
2004/0252027 A1 * 12/2004 Torkkola et al. .............. 340/576
2005/0021597 A1 1/2005 Derasmo et al.
2005/0033517 A1 2/2005 Kondoh et al.
2005/0125110 A1 6/2005 Potter et al.
2005/0134115 A1 6/2005 Betts, Jr. et al.
2005/0177635 A1 8/2005 Schmidt et al.
2005/0190039 A1 9/2005 Aoyama et al.
2005/0193212 A1 9/2005 Yuhara
2005/0261816 A1 11/2005 DiCroce et al.
2006/0056663 A1 3/2006 Call
2006/0142917 A1 6/2006 Goudy
2006/0150197 A1 7/2006 Werner
2006/0156315 A1 7/2006 Wood et al.
2006/0220904 A1 10/2006 Jarlengrip
2006/0250224 A1 11/2006 Steffel et al.
2006/0293813 A1 12/2006 Nou
2007/0027595 A1 2/2007 Nou
2007/0041552 A1 * 2/2007 Moscato ................. 379/214.01
2007/0050854 A1 3/2007 Cooperstein et al.
2007/0072616 A1 3/2007 Irani
2007/0100514 A1 5/2007 Park
2007/0103339 A1 5/2007 Maxwell et al.
2007/0165554 A1 * 7/2007 Jefferson et al. .............. 370/315
2007/0255568 A1 11/2007 Pennock
2008/0070616 A1 3/2008 Yun
2008/0109653 A1 5/2008 Yokohama
2008/0148374 A1 6/2008 Spaur et al.
2008/0150683 A1 6/2008 Mikan et al.
2008/0275604 A1 11/2008 Perry et al.
2009/0030605 A1 1/2009 Breed
2009/0045928 A1 2/2009 Rao et al.
2009/0096596 A1 4/2009 Sultan et al.
2009/0167524 A1 7/2009 Chesnutt et al.
2009/0184800 A1 7/2009 Harris
2009/0195370 A1 8/2009 Huffman et al.
2009/0224867 A1 * 9/2009 O'Shaughnessy et al. .... 340/5.1
2009/0275281 A1 11/2009 Rosen
2009/0298482 A1 * 12/2009 Yen et al. .................. 455/414.2
2009/0309709 A1 12/2009 Bevacqua et al.
2010/0004818 A1 1/2010 Phelan
2010/0007479 A1 1/2010 Smith
2010/0013596 A1 1/2010 Kakiwaki
2010/0030458 A1 2/2010 Coughlin
2010/0039224 A1 2/2010 Okude et al.
2010/0057586 A1 3/2010 Chow
2010/0075655 A1 3/2010 Howarter et al.
2010/0097178 A1 4/2010 Pisz et al.
2010/0148923 A1 6/2010 Takizawa
2010/0178872 A1 7/2010 Alrabady et al.
2010/0191535 A1 7/2010 Berry et al.
2010/0191973 A1 7/2010 Huntzicker et al.
2010/0321203 A1 12/2010 Tieman et al.
2011/0009107 A1 1/2011 Guba et al.
2011/0071720 A1 3/2011 Schondorf et al.
2011/0071725 A1 3/2011 Kleve et al.
2011/0071734 A1 3/2011 Van Wiemeersch et al.
2011/0102146 A1 5/2011 Giron
2011/0105097 A1 5/2011 Tadayon et al.
2011/0106374 A1 5/2011 Margol et al.
2011/0112969 A1 5/2011 Zaid et al.

(56) References Cited

U.S. PATENT DOCUMENTS

| | | | | |
|---|---|---|---|---|
| 2011/0148574 | A1 | 6/2011 | Simon et al. | |
| 2011/0166748 | A1 | 7/2011 | Schneider et al. | |
| 2011/0213629 | A1 | 9/2011 | Clark et al. | |
| 2011/0215921 | A1 | 9/2011 | Ben Ayed et al. | |
| 2011/0275321 | A1 | 11/2011 | Zhou et al. | |
| 2011/0295444 | A1 | 12/2011 | Westra et al. | |
| 2012/0041633 | A1 | 2/2012 | Schunder et al. | |
| 2012/0054036 | A1 | 3/2012 | Nam et al. | |
| 2012/0071140 | A1 | 3/2012 | Oesterling et al. | |
| 2012/0139760 | A1 | 6/2012 | Bevacqua et al. | |
| 2012/0157069 | A1 * | 6/2012 | Elliott et al. | 455/418 |
| 2012/0250517 | A1 * | 10/2012 | Saarimaki et al. | 370/241 |
| 2012/0252425 | A1 * | 10/2012 | Moeglein et al. | 455/418 |
| 2012/0280786 | A1 | 11/2012 | Miller et al. | |
| 2012/0284702 | A1 | 11/2012 | Ganapathy et al. | |
| 2012/0293317 | A1 | 11/2012 | Hanna et al. | |
| 2012/0313768 | A1 | 12/2012 | Campbell et al. | |
| 2013/0005302 | A1 | 1/2013 | Ozaki | |
| 2013/0162421 | A1 | 6/2013 | Inaguma et al. | |
| 2013/0200999 | A1 | 8/2013 | Spodak et al. | |

FOREIGN PATENT DOCUMENTS

| | | |
|---|---|---|
| DE | 102007046270 | 4/2009 |
| EP | 0449471 | 10/1991 |
| EP | 0971463 | 1/2000 |
| EP | 1095527 | 5/2001 |
| JP | 2008195253 | 8/2008 |
| JP | 2008303630 | 12/2008 |
| WO | 2001025572 | 4/2001 |
| WO | 2009158469 | 12/2009 |
| WO | 2012015403 | 2/2013 |

OTHER PUBLICATIONS

Sales@usasupremetech.com, In the U.S. a Car is Stolen Every 26 Seconds, The Wave of the Future, Biometrics Authentication, An Introduction.

Driver Focus-Telematics Working Group, Statement of Principles, Criteria and Verification Procedures on Driver Interactions with Advanced In-Vehicle Information and Communications Systems, Including 2006 Updated Sections, Jun. 26, 2006.

Ford Motor Company, "SYNC with Navigation System," Owner's Guide Supplement, SYNC System Version 1 (Jul. 2007).

Ford Motor Company, "SYNC," Owner's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem," Automotive Design & Production, Oct. 2003, http://findarticles.com pp. 1-3.

* cited by examiner

Network
CPU
Display
Input Selector
BTT
Mdm
Wireless Module
HDD
RAM
GPS
USB
Personal Nav. Dev.
Vehicle Nav. Dev.
USB
Aux Device
USB
A/D
Aux
BT Pair
D/A
USB
Amp
ND

METHOD AND SYSTEM FOR SUPERVISING INFORMATION COMMUNICATION BASED ON OCCUPANT AND VEHICLE ENVIRONMENT

TECHNICAL FIELD

The illustrative embodiments generally relate to selective alert processing utilizing a vehicle computer system.

BACKGROUND

Many states and localities have passed laws prohibiting the use of cellular phones while driving (without a hands-free connection), prohibiting texting while driving, and generally discouraging cellular phone usage while operating a moving vehicle.

In response to this, drivers are now frequently seeking out hands-free connectivity for their portable wireless devices, such that calls can more safely be made while operating a vehicle. In some advanced connectivity solutions, such as the FORD SYNC system, the vehicle computing system, in communication with a wireless device, is capable of reading incoming text messages to a driver, as well as handling incoming calls.

United States Pub No. 2012/0157069 discloses a computer-implemented method that includes receiving, at a vehicle computing system, a notification that an incoming communication is being sent to a wireless device in communication with the vehicle computing system. The method also includes determining that a do not disturb function is active in the vehicle computing system and blocking a notification to a driver regarding the incoming communication. Finally, this method includes sending a command from the vehicle computing system to the wireless device to silence any notification that the wireless device provides in conjunction with the incoming communication.

United States Pub No. 2012/0250517 discloses an approach for managing device do-not-disturb operational modes based on context information. A do-not-disturb manager determines context information associated with a device, a user of the device, or a combination thereof. The do-not-disturb manager also processes and/or facilitates a processing of the context information to cause, at least in part, an activation of one or more operational modes of the device. The do-not-disturb manager also causes, at least in part, a disabling or enabling of one or more functions of one or more applications associated with the device based, at least in part, on the activated one or more operational modes.

SUMMARY

In a first illustrative embodiment, a vehicle computer system includes one or more processors configured to receive context data representative of a vehicle's environment from one or more modules. The one or more processors are programmed and configured to receive the context data from the one or more modules, determine an attention demand value utilizing the context data and a workload value corresponding to the context data, and output an indicator to activate or adjust a do not disturb feature based on the attention demand value.

In a second illustrative embodiment, a computer-implemented method includes receiving context data from one or more data sources representative of a vehicle's environment. The method also includes determining an attention demand value based on the context data and a workload value corresponding to the context data, configuring a do not disturb communication setting based on the attention demand value, wherein the do not disturb communication setting includes two or more options, receiving a request at the vehicle to output a communication, and controlling the communication based on the do not disturb setting.

In a third illustrative embodiment, a vehicle computer system includes a processor configured to receive a signal from a module indicating that one or more vehicle functions is active. Additionally, the processor is programmed and configured to determine an attention demand value utilizing the signal and a workload value corresponding to the signal; and output an indicator to activate or adjust a do not disturb communication feature based on the attention demand value.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The invention now will be described more fully hereinafter with reference to the accompanying drawings, in which illustrative embodiments of the invention are shown. This invention, may however, be embodied in many different forms and should not be construed as limited to the embodiments set forth herein. Like numbers refer to elements throughout. As used herein the term "and/or" includes any and all combinations of one or more of the associated listed items.

Figure 1:
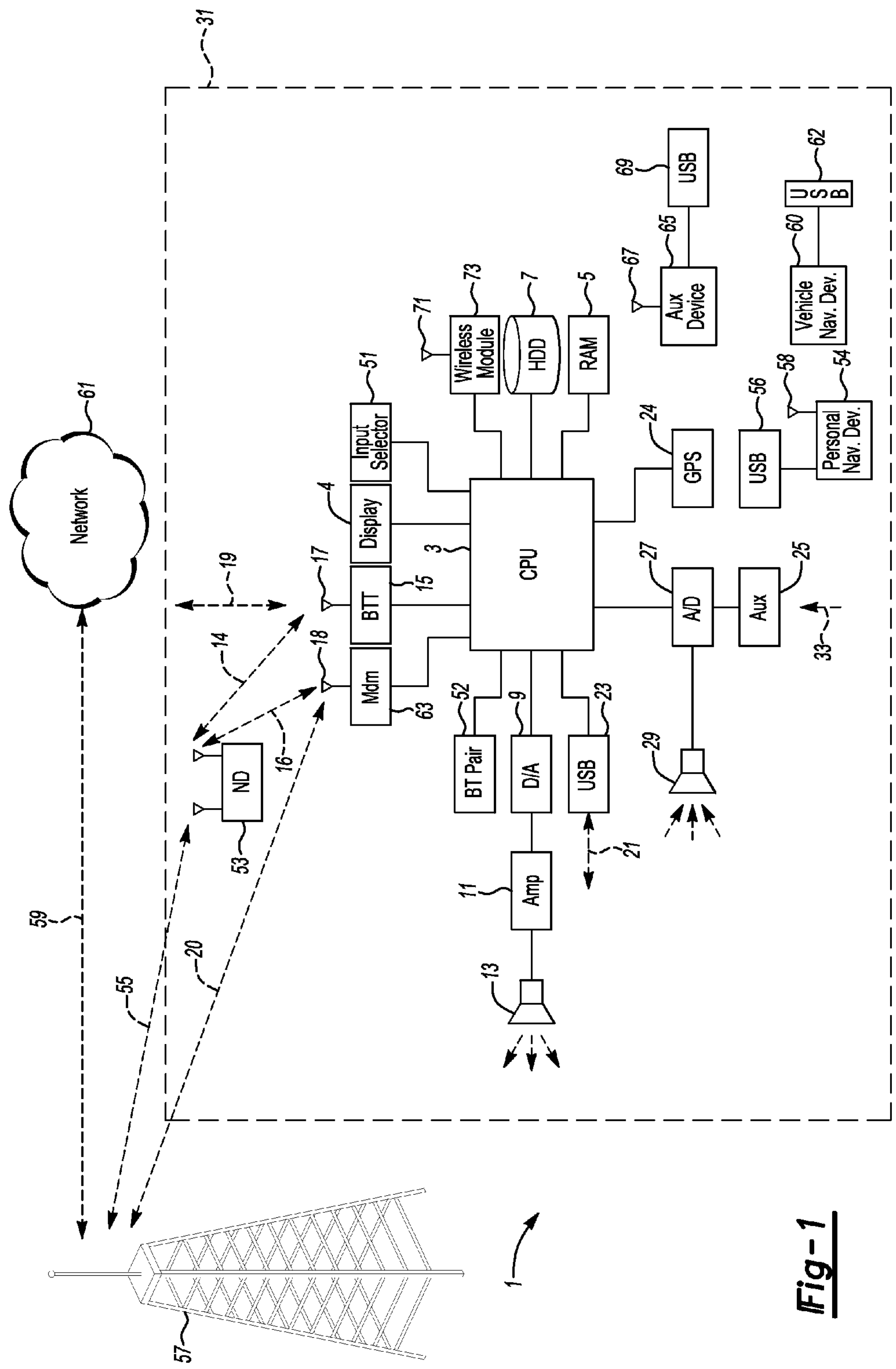
FIG. 1 illustrates an example block topology for a vehicle based computing system for a vehicle.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to select between various inputs. Input to both the microphone and the auxiliary connector is converted from analog to digital by a converter 27 before being passed to the processor. Although not shown, these and other components may be in communication with the VCS over a vehicle multiplex network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, nomadic device, key fob and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

The illustrative embodiments present an alternative to simply disabling or powering-down a wireless device. Instead, the driver is able to put a wireless device into "ignore" mode, or a "selective ignore" mode, whereby some or all calls and/or messages are ignored. This avoids the hassle sometimes encountered in powering a phone up and down (e.g., delays in start-up, missed messages, etc.). Further, in at least one illustrative embodiment, the driver can be notified of any calls, messages, etc. that were missed while the phone was in this mode.

Figure 2:
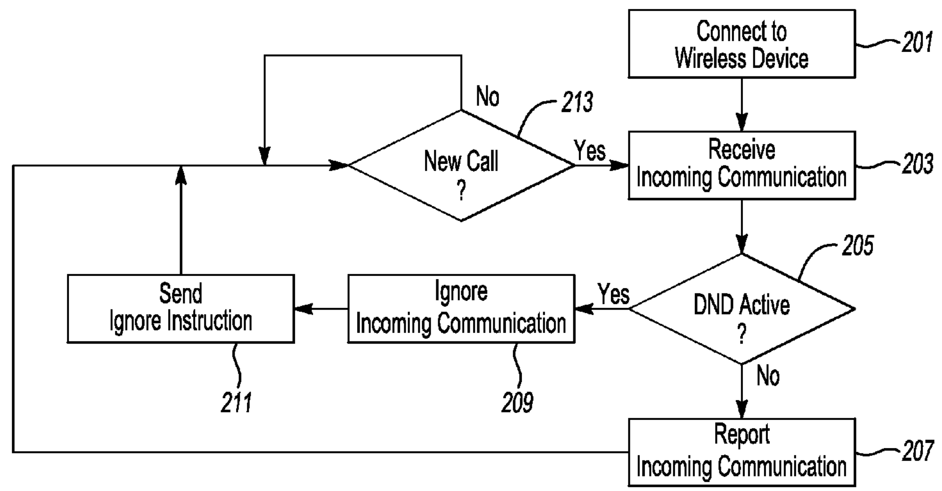
FIG. 2 illustrates an illustrative example of a do not disturb function.

In an illustrative embodiment, shown in FIG. 2, a simple do not disturb function is presented. This function is activated through a vehicle computing system, using, for example, without limitation, a control on the steering wheel, a touch control on a navigation display, a verbal command, etc. Once active, the vehicle computing system will not report incoming calls or messages, and it will instruct the wireless device connected thereto to mute the ring, send the call to voicemail, reject the call, etc.

In this illustrative embodiment, the vehicle computing system connects to a wireless device 201. This connection process is described in more detail with respect to FIG. 1. Once the computing system is connected, it may detect an incoming call or message signal 203 (messages can be text messages, email messages, IM messages, etc.).

When the incoming message signal is detected 203, the system checks to see if a do not disturb function is active 205. The do not disturb function may have been activated through a driver verbal command, use of a manual input, or even in response to a hazardous or potentially hazardous condition detected by a vehicle sensor. For example, the driver may be uncomfortable driving in heavy rain, so the driver may have the system automatically enable do not disturb whenever conditions correspondent with heavy rain are detected by one or more vehicle sensors.

If do not disturb is active, the system will ignore the incoming call or message 209. That is, the system will not report to the driver that a call or message is incoming, so as not to distract the driver. Additionally, since a ringing or beeping wireless device could still distract the driver, the system may also relay a command to the wireless device to reject the call 211 (which could include bypassing a notification signal, sending the call to voicemail without notification, muting a notification signal, etc.).

The bypass may cause the call to go directly to voicemail, or simply mute the signal. It's also possible that one or more rings or partial rings may escape the device before the device is notified by the system, but the system will generally try to avoid this (at least, in this illustrative embodiment), by relaying the "mute" command as quickly as possible. In other illustrative embodiments the wireless device may go unaffected and alert the driver as usual.

When the incoming communication has been dealt with, the system waits for another call 213.

Figure 3:
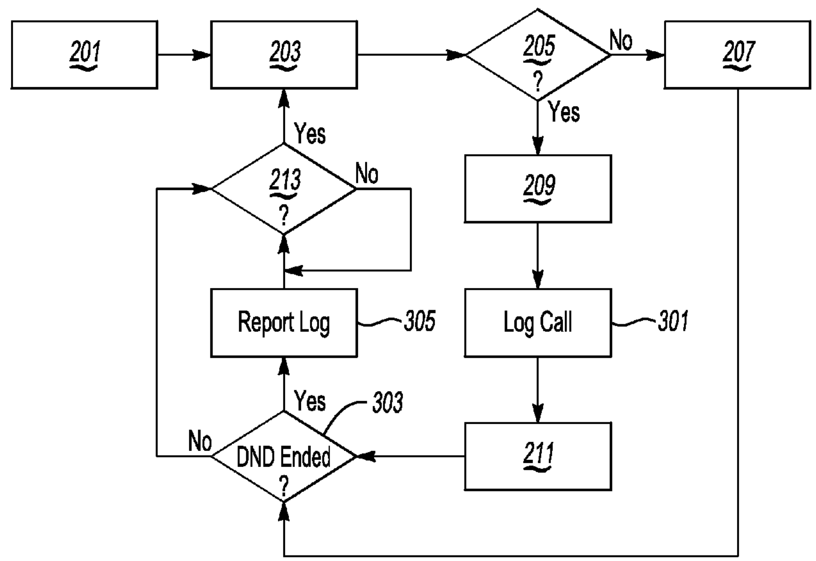
FIG. 3 shows a second illustrative embodiment in which a call/message log is created.

FIG. 3 shows a second illustrative embodiment in which a call/message log is created when calls are "ignored" by the do not disturb function. In this illustrative embodiment, the system may generally function as the exemplary system from FIG. 2. The system will connect to a wireless device 201, receive and incoming call 203, and report the call/message 207 if the do not disturb function is inactive 205.

If do not disturb is active 205, however, then in this illustrative embodiment, prior to ignoring the call 209 and sending an instruction for the ringer to be muted 211, the system will create a log of the call 301. This log can be created on an on-board memory (such as, but not limited to, a HDD or RAM) or the log could be created on the memory of the wireless device.

In this illustrative embodiment, the system checks to see if the do not disturb function has been disabled or ended 303. If the do not disturb function has ended 303, then the illustrative system reports the call/message log to the driver. This report can include, but is not limited to, an audio output, a visual display on, for example, a navigation system window, etc.

If the do not disturb function has not ended 303, then the system checks to see if a call is incoming 213. While waiting for an incoming call, the system (in this illustrative embodiment), periodically checks to see if the do not disturb function has ended. Once a call comes in, the call is handled as described previously with respect to FIG. 3.

Figure 4:
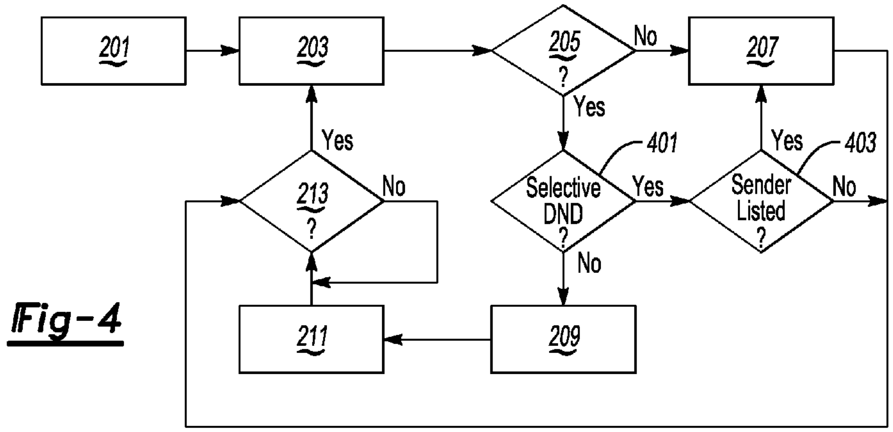
FIG. 4 shows an illustrative example of a selective do not disturb function.

FIG. 4 shows an illustrative, non-limiting example of a selective do not disturb function. In this illustrative embodiment, a selective do not disturb function has been enabled, such that only some calls/messages are filtered out. The user can, for example, create lists of "priority" calls and or message senders, and if a call or message comes in from one of those sources, then the system can "allow" that call to process. The lists could be created on a PC and uploaded to the vehicle computing system, the lists could be selected on the wireless device, or the lists could be input via a vehicle input, such as, but not limited to, a navigation screen display.

In the exemplary system shown with respect to FIG. 4, the vehicle computing system connects to a wireless device 201, receives an incoming call 203, and checks to see if a do not disturb function is active 205. If the do not disturb function is disabled, then the system reports the call 207 as per its standard operation.

If the do not disturb function is active, then, in this illustrative embodiment, the system checks to see if selective do not disturb has been enabled 401. Additionally or alternatively, the system could simply check an "allowed caller" list to see if it is currently populated with any names.

If selective do not disturb is not enabled, or if the incoming call is not from a number on the list 403, then the system ignores the call 209 and sends the signal to the wireless device to similarly silence any notification 211.

If selective do not disturb is enabled and if the incoming call/message is from a number (or name, designation, etc.) on the list of allowable callers/messengers, then the system alerts the driver 207 if the do not disturb function had not been enabled.

Figure 5:
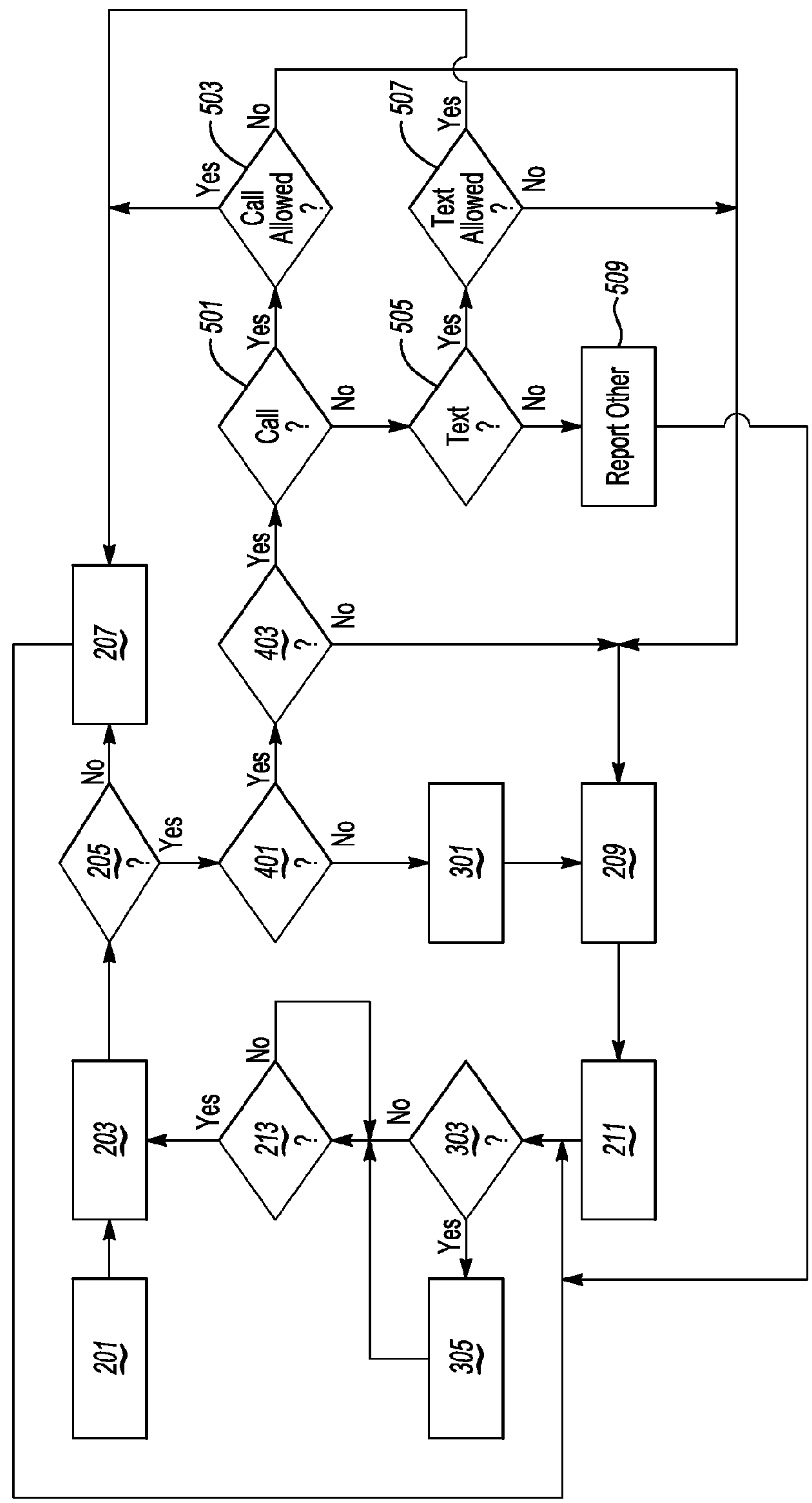
FIG. 5 shows an illustrative example of a system including selectivity based on incoming notification type.

FIG. 5 shows an illustrative, non-limiting example of a system employing aspects of the illustrative examples shown in FIGS. 2-4 and including selectivity based on incoming notification type as well as caller/messenger.

In this illustrative embodiment, the system connects to a wireless device 201 and receives an incoming call/message 203. While the incoming notification has been described herein as a call or message, it can include, but is not limited to, a phone call, a text message, an email alert, an IM message, etc.

If the do not disturb function is not enable 205, then the system handles the incoming notification in a customary manner 207. If do not disturb is enabled, then the system checks to see if selective do not disturb has been enabled 401. If selective do not disturb has not been enabled, then the system will log the incoming call/message 301 and ignore the call/message 209. The system also sends a signal to the wireless device to mute any audible notification 211 (visual notification may also be suppressed). The system then cycles between waiting for a call 213 and checking to see if do not disturb has been disabled 305, at which point it will report the log of missed calls to the driver 305.

If selective do not disturb has been enabled, then the system checks to see if the caller/messenger is on the "allowed" list 403. If not, the system will ignore the call and proceed with step 301. If the caller is on the allowed list, then, in this illustrative embodiment, the system checks to see if the incoming message is a phone call 501, a text message 505 or another type of message 509. If the message is "other" (e.g., not a message type that is recognized, although it is understood that the system is capable of checking for, recognizing and reporting IM, email, etc.), the system reports that an unrecognized communication has been received from an allowed caller 509 and then proceeds with waiting for another incoming call 303.

If the incoming notification type (in this embodiment) corresponds to a call 501 or a text 505, then the system (respectively), checks to see if calls 503 or texts 507 are allowed. It may be the case that the driver does not wish to receive any texts, but does wish to receive calls from certain allowed numbers. In this illustrative embodiment, the driver has the degree of freedom not only to specify who may call or message, but also what types of incoming notifications are or are not ignored. If the type is allowed, then the system reports the notification to the driver 207. If the incoming type is prohibited, then the system proceeds to log the ignored notification 301 and waits for a new notification to arrive.

Additionally, due to delays in processing and wireless communication between a vehicle computing system and a wireless device, it may not be possible to selectively allow certain calls (e.g., all calls may need to be blocked). It is possible, however, to provide a notification when, for example, an "approved" call has been blocked (allowing the driver to call that person back immediately). In another illustrative example, the system could automatically call back blocked calls from an "approved" list. In yet a further illustrative embodiment, if multiple calls came in a short span of time, do not disturb may be temporarily disabled, in case an emergency condition has arisen whereby someone needs to reach the vehicle occupant.

Figure 6:
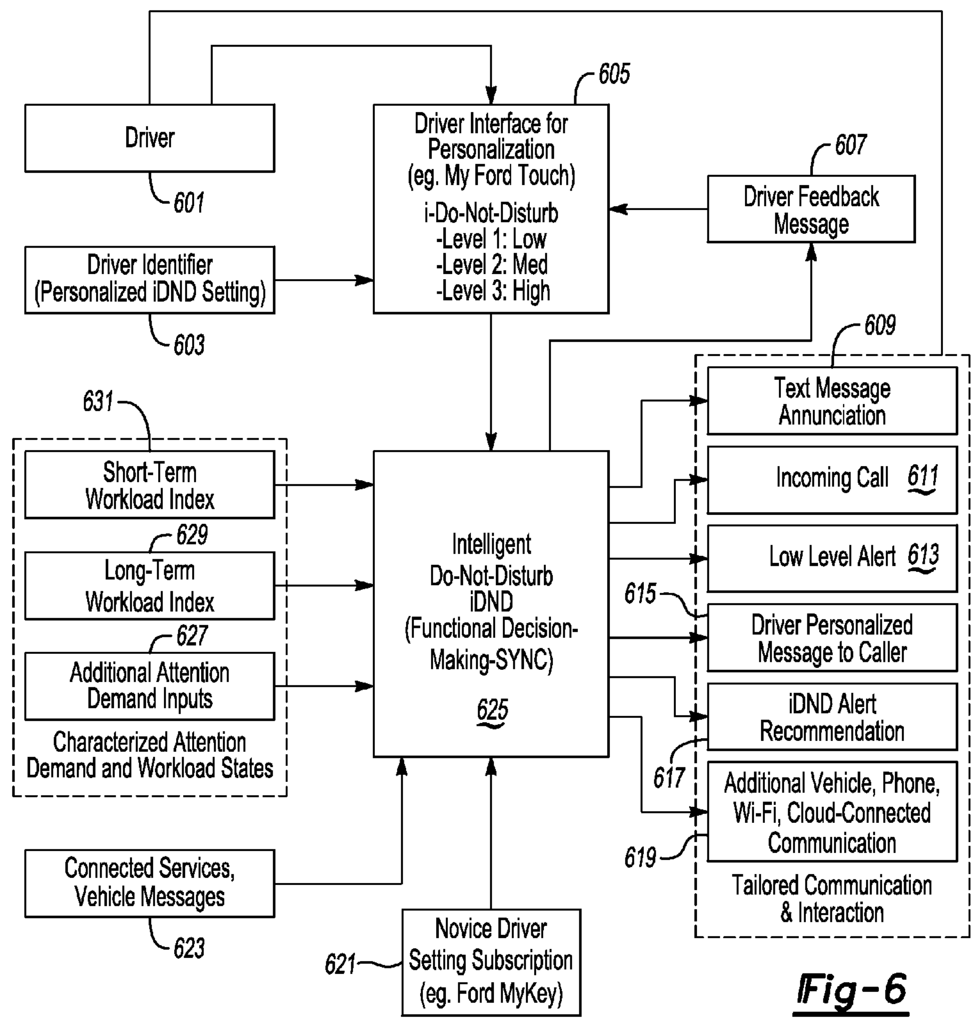
FIG. 6 shows an illustrative example of a system including a personalized intelligent do not disturb function.

FIG. 6 shows an illustrative, non-limiting example of a system including a personalized intelligent do not disturb (DND) function. A driver 601 may be utilizing various functions within the vehicle that require additional workload. Various vehicle information and calculations may be utilized to determine the driver's workload state, such as those described in PCT/US2010/043605 entitled "SYSTEMS AND METHODS FOR SCHEDULING DRIVER INTERFACE TASKS BASED ON DRIVER WORKLOAD," which is hereby incorporated by reference. The driver identifier 603 may utilize a cell phone, seat position, key fob, and other unique items tailored to a specific driver, in order to recognize a driver. Upon recognizing the driver, the intelligent do not disturb system may be able to utilize the personalized DND function. In one example, a vehicle computer system utilizes the driver identifier 603 to extract ID information from a driver's key fob or paired cell phone. Upon recognizing and identifying a driver, the DND setting may be tailored to that specific driver.

The DND interface 605 may allow a user to select various levels of the DND feature, rather than simply turning the setting on or off The driver may set the level of information coordination intensity for the respective levels. For example, the "Low" setting may only allow low priority alerts, such as text messages and in-vehicle messages, to be postponed during short-term (e.g. 3-5 seconds) intervallic high attention-demand situations. The information may then be provided during low attention demand states. In another example, the "Medium" setting may allow incoming phone calls and cloud connected information messages to be postponed during short-term (3-5 seconds) intervallic high attention-demand situations. In yet another example, the "High" setting may offer only very limited connectivity communication. Only critical messages, which may be pre-defined or user-defined, may be presented to the user. Some examples of critical messages may be an alert to the user that the engine is overheating, or a message from a vehicle's collision warning system. The driver may also be able to set the DND function off to allow all messages to pass through.

A driver feedback message 607 may alert the driver when the DND function should be turned on, dependent on the workload of the driver. The driver feedback message may be in the form of an audible message, a visual message, or any combination thereof. Thus, the driver can be notified that a possible optimal DND setting is available to meet the driver's current workload demand.

The intelligent do not disturb functional decision making 625 may utilize various inputs and algorithms to calculate when to provide the driver feedback message 607. The functional decision making 625 may utilize the drivers characterized attention demand and workload states to determine the user's current environment. Some examples of inputs utilized is the short term workload index 631. The short term workload index may calculate the instant or real-time workload demand of the driver. Some driving situations that may be representative of scenarios that require a short term workload index are navigation roadway/freeway merges, wide turns, lane changes, difficult curves, and extreme acceleration and deceleration by the driver. The long-term workload index 629 is another example of an input that is utilized by the DND functional decision making 625. The long-term workload index 629 may evaluate and calculate the driver's workload or stress over a longer period of time or for an upcoming scenario that may be in the future. Some long-term driving scenarios that may require increased attention demand for the driver include rainy conditions, slippery conditions, dense traffic, etc. During these long-term driving scenarios, the system may be configured to provide an automatic prompt providing the driver to select the "High" setting of the DND function. Additional attention demand inputs 627 may be utilized as well. Additional inputs could be the driver's head position that is retrieved from an in-vehicle camera, or a driver's psychological information obtained from a brought in device, on-board, or an off-board server.

Various connected services and vehicle messages 623 are also in communication with the DND functional decision maker 625. The connected services 623 may be both a wired or wireless connection. Some examples of messages that may come from a connected service include messages from a user's Bluetooth phone (e.g. phone call or text message), SAT radio services, traffic services, weather services, etc. Furthermore, vehicle messages may be any message set to output to the user that is related to a vehicle module. Some examples of vehicle messages may be a fuel warning indicator, oil change indicator, tire pressure monitor, audio or video messages, and various pop-ups from the HMI. Additionally, applications that may be running on a user's mobile phone and connected to a vehicle computer system utilizing an API, such as Ford's APPLINK, may request to send incoming communications to the driver. One example may be include a "tweet" from a user's Twitter account that is in communication with the vehicle computer system from a mobile phone. The "tweet" may be evaluated as an incoming message and could be delayed or blocked by the DND function, based on the DND setting and the driver's current environment.

Furthermore, a novice driver setting subscription indicator 621 may be sent to the functional decision maker 625. A certain key fob, e.g. FORD MYKEY, may be utilized for a novice driver with poor driving habits or minimal driving experience. The functional decision maker 625 may receive a message that the driver is currently using the vehicle. This may allow the decision maker 625 to override certain settings to enforce stricter requirements for broadcasting messages to the novice driver. Thus, previous settings that have been activated may be overrode and block all or many of the messages to be output to the novice driver.

Upon gathering various information, data, and messages related to the drivers attention demand and workload, the functional decision maker 625 may determine how to limit, prevent, postpone, or annunciate the messages for presentation to the user based on the driver's workload. The communication and interaction of the messages and data may be tailored to the driver and current driving environment or scenario. In one example, text message annunciation 609 maybe delayed or presented to the user based on the environment. The vehicle may utilize a text-to-speech engine to output the message via the vehicle speakers. Additionally, an incoming call 611 may be silenced based on the driver's workload. A low level alert 613 may be presented to the user. Such alerts may include a message or communication stating the vehicle's fuel is low, tire pressure is low, or a check engine light. Additionally, the driver may be able to output to a driver a personalized message 615 to a caller if a caller's incoming mall or message is delayed by the DND feature. In one example, the message may state "I am currently driving. I will get back to you once I am parked." Any type of message may be personalized by the user. The system may be capable of automatically populating a message based on the message. In one scenario, if the driver is experiencing severe down pour and a caller drives to send a text to the driver, the DND feature may utilize the weather data to send a custom message to the caller stating "John is currently driving in a rain storm. When he is available, he will get back to you."

In another example a DND alert recommendation 617 may be output based on the workload scenario. The alert may be utilized to recommend a different setting of the DND feature or turning the DND feature on/off based on the current user environment. In one example, a pop-message or an audible warning may alert the driver to change the setting based on the driver's environment. The DND alert recommendation 617 may be in the form of voice, visual-flashing or a combination thereof. In another example, the functional decision maker 625 may be tailored to provide intelligent communication to additional vehicle, phone, Wi-Fi, Cloud-connected communications 619. For example, the system may be configured to utilize a configurable setting to tailor incoming communications from a social networking site. Furthermore, the system may be configured for various connectivity messages of appropriate information to be delivered to the driver for various applications and application developers, such as those used by the FORD SYNC system and the FORD APP-LINK system. In one illustrative example, a smart-phone may have a weather application that is capable of delivering localized weather content to the system, such as a pollen alert message.

Figure 7:
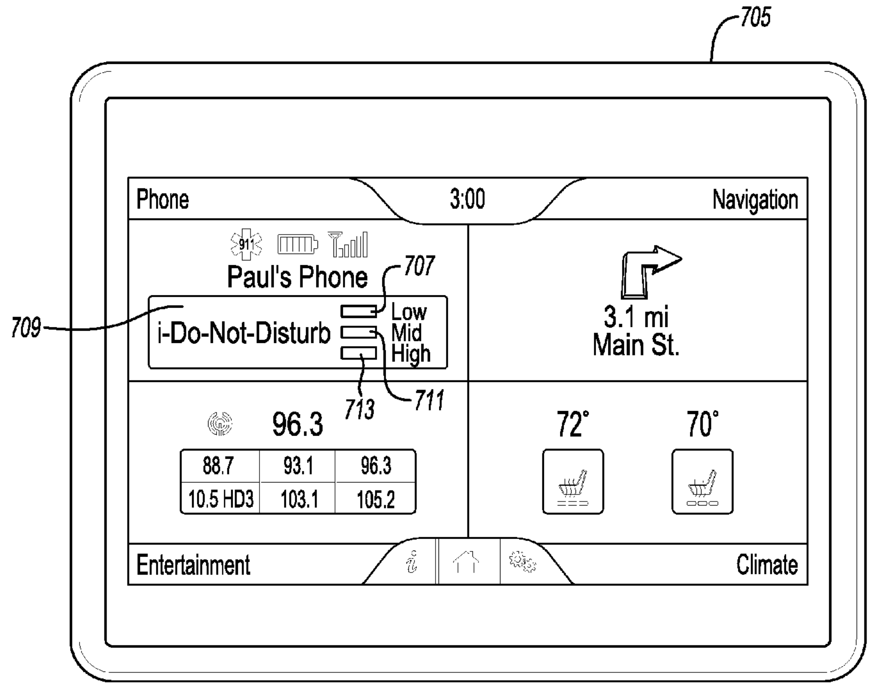
FIG. 7 shows an illustrative example of a do not disturb function with driver selectable levels for personalization.

FIG. 7 shows an illustrative example of a do not disturb function with driver selectable levels for personalization. In this embodiment, the DND feature is incorporated in the driver display. The communication messages and information delivery for the various DND levels, in addition to a core base set-up, are flexible and configurable. The user interface screen 705 may output various content and information for the driver. Within the user interface screen, the do not disturb button 709 may be located. The do not disturb button 709 contains three customizable levels for driver personalization The "Low" setting 707 may allow for more messages to be output to the user than the "Medium" setting 711 and "High" setting 713. Additionally, the user may be able to select the DND feature off. When selected off, the DND feature is not activated and the vehicle computer system may allow all messages and alerts to be presented to the driver. Although the illustrative embodiment depicts three levels of settings, any number of levels may be available. Furthermore, the DND button is not limited to a driver display, but may also be used on a hard button anywhere in the vehicle or any display located in the vehicle. The communication or messages that are received from the vehicle computer system may also have different importance values associated with them. Thus, a message that indicates a flat tire which wishes to be sent to the tell-tale, may be more important than a text message or phone call received from a mobile phone paired with the vehicle's multimedia system.

Figure 8:
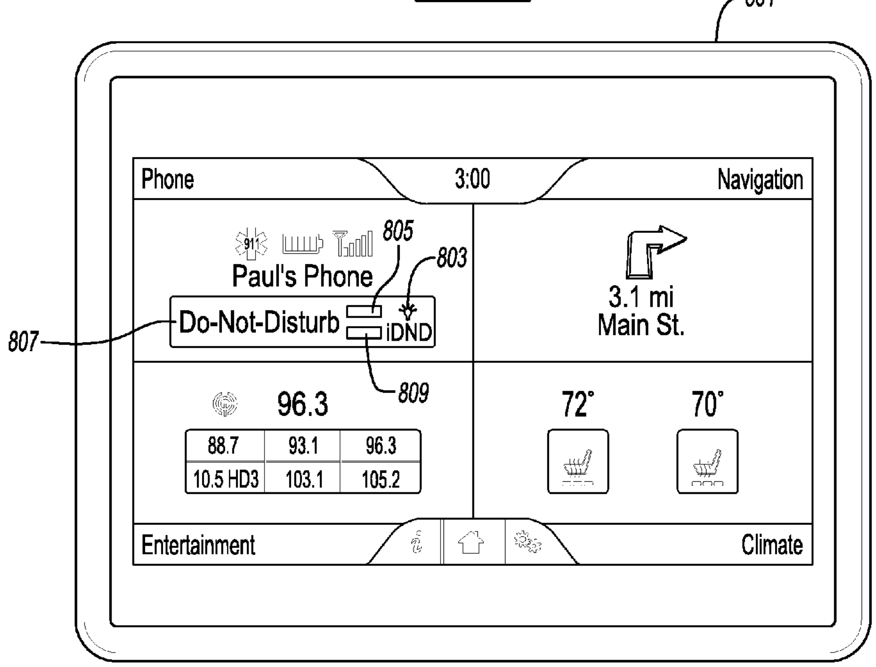
FIG. 8 shows an illustrative example of an automatic do not disturb function.

FIG. 8 shows an illustrative example of an automatic do not disturb function in a driver display. The DND interface screen 801 allows the DND feature to be selected with DND button 807. The DND button 807 may allow the selection to be toggled through an automatic selection indicator 805, or a manual DND selection 809. If the automatic DND function is selected by the driver, low priority alerts, text-messages, in-vehicle messages, incoming phone calls, and connectivity information are automatically proponed during a short-term (3-5 seconds) intervallic high attention-demand situations.

An icon 803 may be activated when the automatic DND feature is selected. The delayed message may be provided when attention demand becomes low. If the manual DND feature is selected, limited vehicle-driver and connectivity communications are provided to the driver. Of course, critical messages may be provided to the driver. The driver may also have the capability of turning off the DND button.

Figure 9:
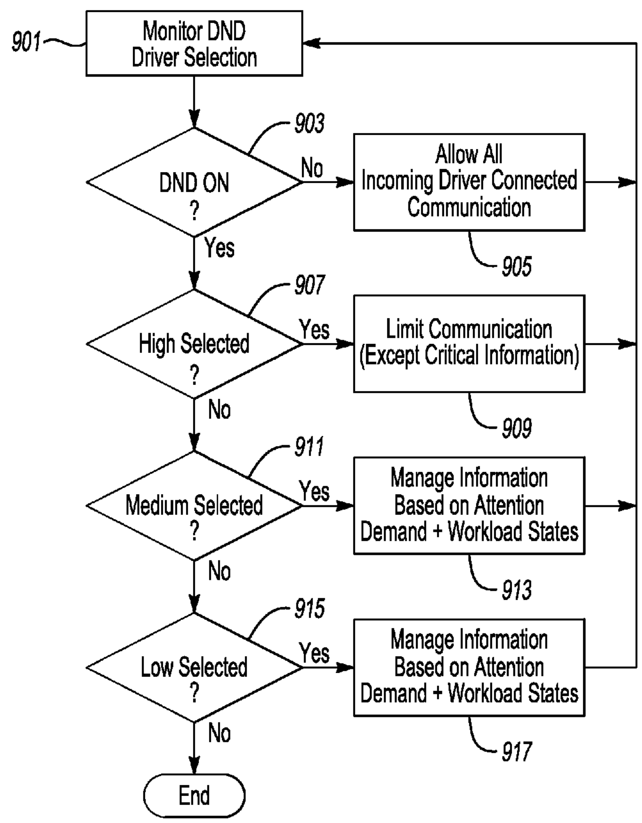
FIG. 9 shows an illustrative example of a flow chart utilizing an illustrative example of driver customized information management of the do not disturb function within a vehicle computer system.

FIG. 9 shows an illustrative example of a flow chart utilizing a driver customized information management system of the do not disturb function within a vehicle computer system. The vehicle computer system may monitor the do not disturb selection of the user 901 in the background of the operating system. This may be a feature that a user can select on, or it can be transparent to the user and may be always running in the background. Monitoring of the selection of the do not disturb function allows the vehicle computer system to track different scenarios that may lead a user in selecting the DND feature.

The vehicle computer system may analyze if the do not disturb function is currently on 903. If the DND function is not on, the vehicle computer system will allow all incoming driver connected communication 905. Thus, when a paired Bluetooth phone receives a text message, the vehicle computer system may output the message via the vehicle's speakers or a vehicle display, rather than ignore or postpone delivery of the message. If the DND function is on, the vehicle computer system may then begin to analyze the level of the DND setting. Thus, the system may analyze whether the "High" setting is selected 907. Upon receiving confirmation that the "High" setting is selected, the vehicle computer system may limit the communication that is delivered to the driver 909. In one example, a selection of the "High" setting may limit all communications besides critical information 909. For example, if the user has the "High" setting selected and a text message is received at the user's Bluetooth phone, the system may delay the delivery of the message. However, if the engine ECU determines that there is a faulty component, the "CHECK ENGINE" warning may still be delivered due to the crucial importance of this warning. Additionally, a user may be allowed to adjust the types of communication limited to being received when the "High" setting is selected.

In an alternate scenario, if the "High" setting is not selected, the system may check if the "Medium" setting is selected 911. If the "Medium" setting is selected, the system may manage the information retrieved by the vehicle computer system to output to the driver based on both the attention demand and the workload states of the driver 913. Thus, information may be output to the driver in a delayed fashion. For example, incoming phone calls and cloud connected information messages may be postponed during short-term (3-5 seconds) intervallic high attention-demand situations. Otherwise, if the driver demand is not high, the system may output the message to the user. Critical messages may also be output to the driver if the selection is "Medium."

In an alternate scenario, if the "Medium" setting is not selected, the system may check if the "Low" setting is selected 915. If the "Low" setting is selected, the system may manage the information retrieved by the vehicle computer system to output to the driver based on both the attention demand and the workload states of the driver 917. Thus, synchronous information and text messages may be output to the driver in a delayed fashion if the "Low" setting is selected. For example, low priority alerts, text messages, and in-vehicle message may be postponed during short-term (3-5 seconds) intervallic high attention-demand situations. Thus, the information may be delayed and output to the driver during low attention demand states. Additionally, if the driver demand is not high when an incoming message is present, the system may output the message to the user. Critical messages may also be output to the driver if the selection is "Low."

Upon verification of the selected setting or when deactivating the setting, the system may continue to analyze the level of the DND setting. Furthermore, it should be noted that the particular order of the flow chart may be different than that illustrated in FIG. 9. For example, the system may check to determine if the "Medium" setting is selected prior to determining if the "High" setting is selected, and so forth. Furthermore, not all steps are required in other alternative embodiments. Thus, one could construct the order of the flow chart in numerous ways.

Figure 10:
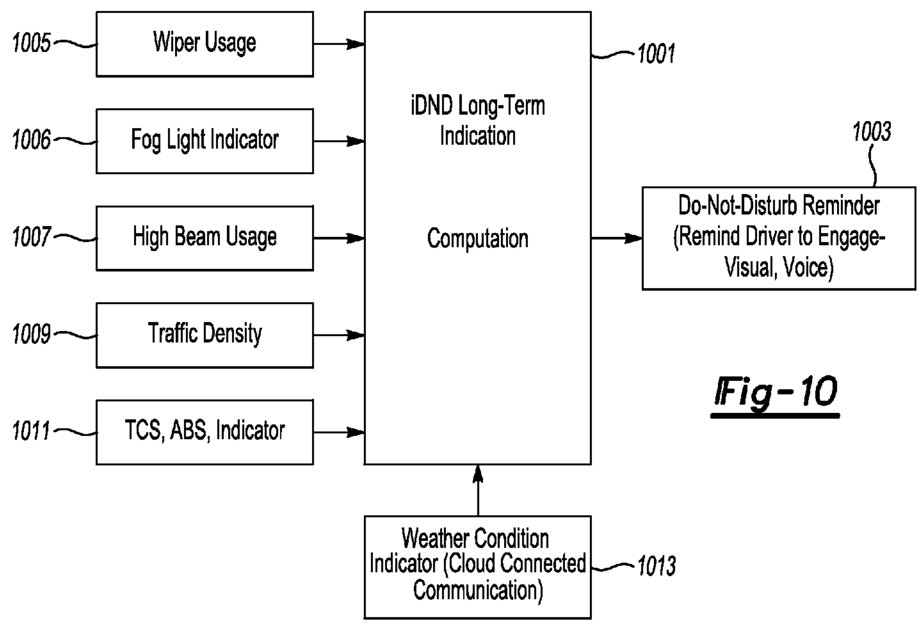
FIG. 10 shows an illustrative example of a block diagram for the do not disturb function utilizing a long-term indicator computation.

FIG. 10 shows an illustrative example of a block diagram for the do not disturb function utilizing a long-term indicator (LTI) computation. The block diagram is a system for long-term computation based on driver initiated vehicle interactions. Additionally, cloud connected information may also be incorporated. The long-term indication computation 1001 may utilize various inputs to compute attention demand. The LTI computation may recognize a situation in which the driver may enter a scenario in which heightened focus is required for the driving environment. Various vehicle components may send context data to determine a vehicle environment and calculate driver demand. The context data may be used to help identify environments that may include driving in a long stretch of stop-and-go traffic, driving in a rain/snow storm, driving in a foggy condition, etc. Thus, it may be advantageous that the vehicle computer system understand the upcoming difficult driving scenario to recommend the driver to activate the DND feature. Driver selection and vehicle indication of leading attention demand vehicle usage, including fog light selection, high beam usage, traction control and anti-brake system triggers, provide an indication of driver attention demand. Wiper usage data 1005 may be sent to the long-term indication computation 1001. Wiper usage data may be representative of severe weather that a user is experienced. Fog light indicator data 1006 may be sent to the LTI computation 1001. The fog light indicator data may indicate that a driver may be in dark/foggy area, thus heightened awareness is required by the driver. High beam usage data 1007 may also be utilized for similar driving scenarios. Traffic density data 1009 may be utilized to determine the driver's surrounding environment. Traction control system and anti-braking system indicators/data 1011 may be utilized to identify a high stress or high workload scenario that the driver may be experiencing, such as slippage of the tires or loss of control of the vehicle. Weather data 1013 may be utilized to understand the impact that the climate has on the vehicle's driving environment. The weather data may be retrieved from an off-board server that is utilizing a long-distance connection to communicate with the vehicle. In one example, the weather data may indicate that the weather is currently snowy or experiencing fog. Thus, the processor computing the long term indication may utilize the data that is representative of the current weather data to calculate a workload for a driver. Additionally, other vehicle sensors or off-board servers may be utilized to facilitate computation of the driver's attention demand.

The context data retrieved from the various vehicle components may be data that simply indicates whether a setting is on or off. Other vehicle components may send data that contains different values that are representative of the workload attainable to the user given the condition. Upon retrieving all the various vehicle data and usage that provides an indication of driver attention demand a calculation is done by the do not disturb function's LTI computation. A minimum number threshold is configured by the vehicle system. The threshold may be set by a user or by the manufacturer. When do not disturb function's LTI computation calculates that the threshold is exceeded, the DND reminder is provided. For example, the number of TCS or ABS triggers may be summed together. When a minimum number threshold is exceeded the iDND reminder is provided. For indicators which may be turned on or off quickly, an approach to provide long-term attention demand reminders is required. When a LTI device is engaged at any time instant k, for example, the output is given by:

$$LTI_i(k)=\lambda\cdot LTI(k-1)+(1-\lambda)\cdot 1 \quad (1)$$

When a LTI is not engaged, the output is given by:

$$LTI_i(k)=\lambda\cdot LTI(k-1)+(1-\lambda)\cdot 0 \quad (2)$$

$LTI_i$ may be the leading indicator for long-term tracking value for each on/off long-term leading indicator, such as a vehicle component, being tracked, and γ is a tuning factor. Thus, each device that the user interacts with may have a different tuning factor that is indicative of a workload value. For example, the fog lights may have a different tuning factor than a brake module. Furthermore, within each device a different tuning factor maybe representative by different scenarios. For example, if an off-board traffic server outputs to the vehicle computer system different degrees of traffic, each degree of traffic may have a different tuning factor.

The interaction with leading long-term attention indication is aggregated into a composite index. The LTI output may then be given by:

$$LTI=\max(LTI_1,LTI_2,LTI_3, \ldots LTI_n) \quad (3)$$

When the LTI is above a threshold value of 0.7 for example, a DND "High" reminder is provided for a selected period of time. Different values may trigger different reminders. Additionally, the values may be modified by the user or manufacturer to be tailored to the system or driver. Thus, the DND method and system described provides a way for personalized information and connectivity management for convenient driving experiences.

Figure 11A:
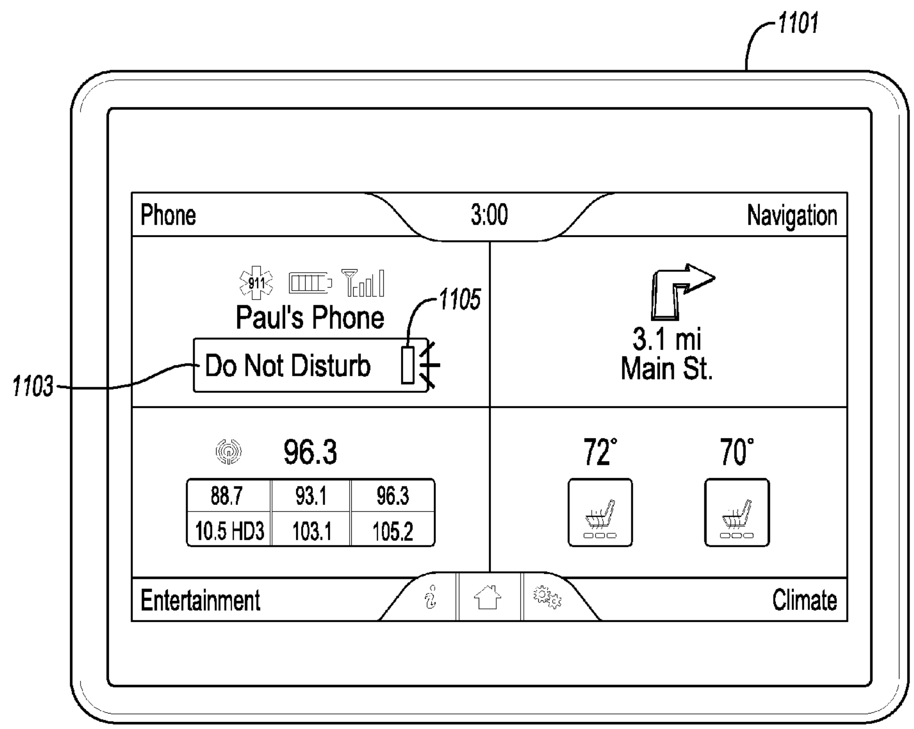
FIG. 11A shows an illustrative example of an augmented visual indicator configured to prompt a driver based on real-time conditions.

FIG. 11A shows an illustrative example of an augmented visual indicator configured to prompt a driver based on real-time conditions. The interface screen 1101 may have a do not disturb button 1103 that is selectable by a user. However, the DND button 1105 may also be configured to automatically prompt the driver based on the vehicle surroundings. If the LTI output calculation is above a threshold value, a reminder 1105 may flash or display to prompt the driver that the DND function has been activated. Although the embodiment above describes a visual indicator, there may also be an audible indicator to output audible instructions to the user to activate the DND setting. The reminder may be activated for not only announcing to the user that the DND setting is off and should be activated, but also to suggest another level (e.g. change the 'Low' setting to 'High') that the user may benefit in using.

Figure 11B:
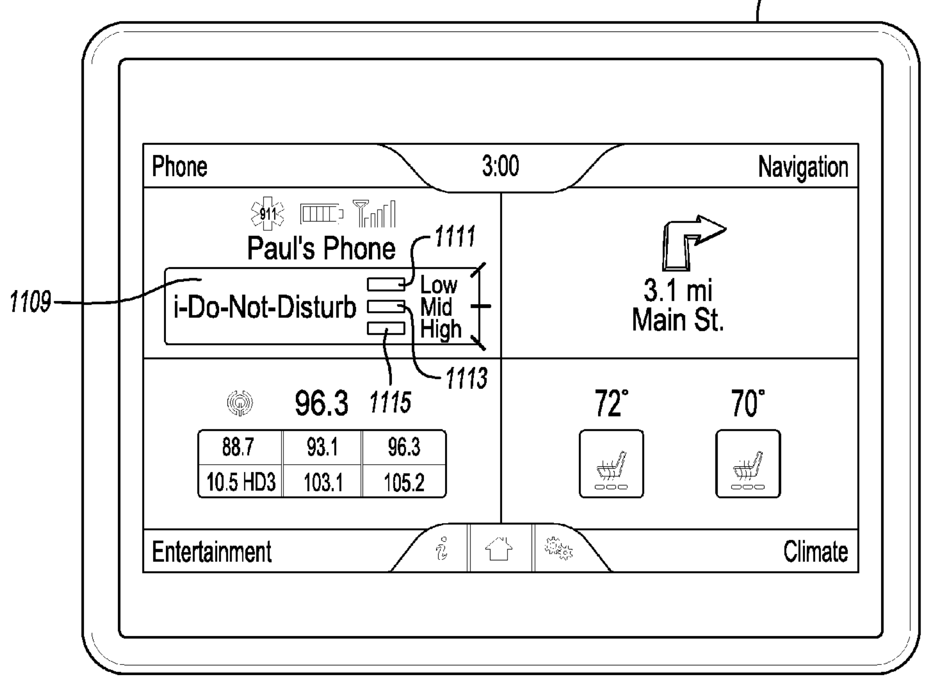
FIG. 11B shows an example of a do not disturb function with driver selectable levels of personalization that is configured to output a visual indicator to prompt the driver based on real-time conditions.
Figure 12:
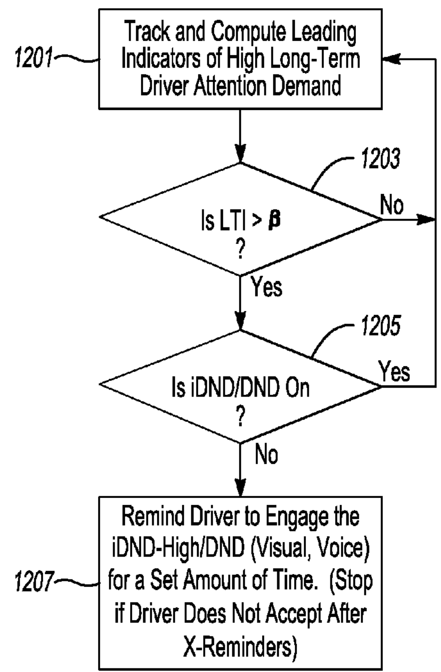
FIG. 12 shows an example of a flow chart utilizing the driver customized information management with an intelligent do not disturb function reminder.

FIG. 11B shows an example of a do not disturb function with driver selectable levels of personalization that is configured to output a visual indicator to prompt the driver based on real-time conditions. The interface screen 1107 may contain a DND button 1109 that contains various settings, such as "High" 1115, "Medium" 1113, and "Low" 1111. The settings may be automatically prompted based on the vehicle's surround settings. Thus, a reminder may flash on one of the DND's settings which is calculated to be most suitable for the driver's conditions. As an example, when the LTI output is above 0.7, for example, the "High" reminder may be triggered, along with the option of an audible beep when the indicator is flashing. In another example, an LTI output within the range of 0.3-0.7 may trigger a reminder for the "Medium" setting. An LTI output range below 0.3 may trigger the "Low" setting. Although a visual reminder is depicted in FIG. 11B, an audible reminder may also be triggered. For example, if a certain threshold is meant during calculation of the LTI output, the vehicle computer system may prompt the user through the vehicle's speakers an audible menu asking "Would you like to set your Do Not Disturb feature to High?" Based on the driver's voice command, the driver maybe chose to activate the recommended setting, another setting, or a simply select to ignore the reminder and keep the DND function off FIG. 12 shows an example of a flow chart utilizing the driver customized information management with an intelligent do not disturb function reminder. The vehicle computer system may track and compute leading indicators of high long-term driver attention demand 1201. The tracking may be accomplished in the background without any user interaction. The leading indicators may be the same indicators as disclosed in FIG. 10. Upon tracking and computing the long term indication (LTI) output, the vehicle computer system may determine if the LTI output is greater than a specific threshold value, which is indicated by the symbol β. The threshold value β may be set by the user in certain embodiments, or the vehicle manufacturer in other embodiments. If the LTI output does not meet the value of β, the system will continue to track and calculate the LTI output. However, if the LTI output is greater than β, the vehicle computer system may assume that the driver is in a situation which requires greater driver attention. Thus, upon determining that the driver is experiencing a high attention scenario, the vehicle computer system may determine if the intelligent DND or manual DND function is currently running 1205. If the setting is on for either DND function, the vehicle computer system may continue to utilize the function according to the DND setting (i.e as in FIG. 9 or FIG. 13). However, if the vehicle computer system determines that the DND functionality is not active and the long term driver attention demand exceeds the threshold value β, the system may send a reminder to the driver 1207. The reminder may be in the form of a visual indicator, as illustrated in FIG. 11A or 11B, or it may be audible. The reminder may be active for a set amount of time. Thus, the manufacturer of the vehicle computer system, or the driver, may be able to customize the amount of time the reminder is maintained active. The reminder may timeout after a certain amount of time or a certain number of reminders. Again, the amount of reminders of time that the reminder stays active may be customized by the driver or the vehicle manufacturer.

Figure 13:
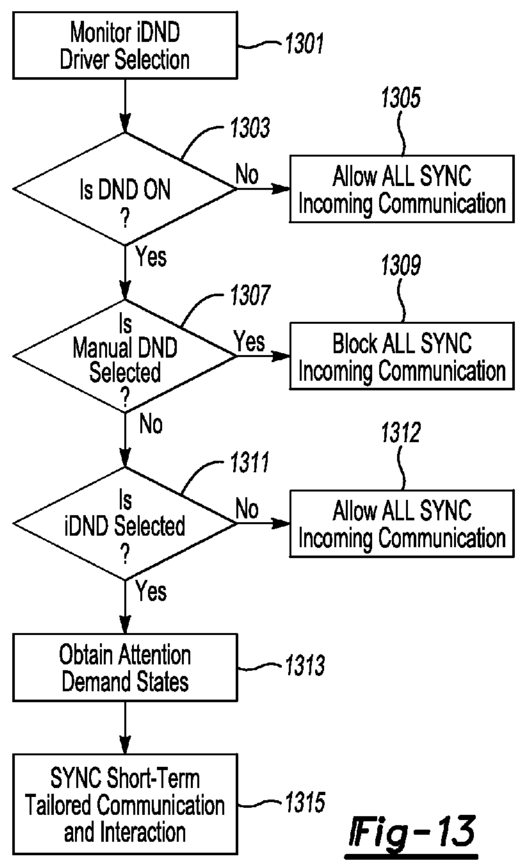
FIG. 13 shows an example of a flow chart of the different do not disturb functions interacting with one another.

FIG. 13 shows an example of a flow chart of the different do not disturb functions interacting with one another. The vehicle computer system may be currently monitoring the user's intelligent do not disturb selection 1301. The system may first determine if any do not disturb function is currently active 1303. If the DND function is not active, the vehicle computer system may be configured to allow incoming communications through the SYNC multimedia system 1305. However, if a DND setting is active, the vehicle computer system may proceed to determine which type of DND setting is active. The vehicle computer system may determine if the manual DND function is selected 1307. If the manual DND feature is active, the vehicle computer system may block all incoming communication 1309 to the user.

In the alternative, the manual DND feature may not be active. Thus, the vehicle computer system may determine if the intelligent DND function is active. If the intelligent DND function is not active, the vehicle computer system may allow all incoming communication 1312. However, if the intelligent DND function is selected, the vehicle computer system may obtain the attention demand states for the driver 1313. The attention demand states may be calculated utilizing the components illustrated in FIG. 10. Upon calculating the attention demand states, the vehicle computer system, such as FORD SYNC, may tailor the communication and interaction of various driver components to the vehicle user 1315. For example, the different settings and tailored communication of FIG. 9 may be utilized to limit the interaction of the vehicle computer system.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, smart phones, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle system, comprising:

one or more sensors on the vehicle configured to generate context data;

one or more processors of the vehicle system located in a vehicle configured to receive context data representative of a vehicle's environment from the one or more sensors, wherein the one or more processors are further programmed and configured to:

receive the context data from the one or more sensors;

determine an attention demand value based on the context data and a workload value corresponding to the context data; and output an indicator based upon the determination and suggesting activation or adjustment of a plurality of configurations each corresponding to an individual magnitude of inhibiting communication via a do not disturb communication feature that inhibits communication to a driver.

2. The vehicle system of claim 1, wherein the do not disturb communication feature is configured to delay an incoming communication to a vehicle occupant.

3. The vehicle system of claim 1, wherein the vehicle system further comprises a vehicle speaker configured to output the indicator suggesting activation or adjustment of the do not disturb communication feature via an audible message.

4. The vehicle system of claim 1, wherein the vehicle system further comprises a vehicle display configured to output the indicator suggesting activation or adjustment of the do not disturb communication feature via a visual indicator.

5. The vehicle system of claim 1, wherein the processor is further configured to receive an user input to activate or adjust the do not disturb feature based on the indicator.

6. The vehicle system of claim 1, wherein the one or more sensors include a transceiver configured to communicate with a nomadic device or an off-board server.

7. The vehicle system of claim 1, wherein the one or more sensors include a cellular phone in communication with the vehicle system.

8. The vehicle system of claim 7, wherein an incoming vehicle communication is received from the cellular phone and the processor is further configured to send a message to the cellular phone indicating that a user is unavailable when the do not disturb communication feature is activated.

9. The vehicle system of claim 8, wherein the message is capable of being customized by a vehicle occupant.

10. The vehicle system of claim 1, wherein the context data indicates the one or more sensors are off.

11. The vehicle system of claim 5, wherein the processor is further configured to activate or adjust the do not disturb feature based on the user input.

12. The vehicle system of claim 1, wherein the workload value corresponding to the context data is based on a type of usage of the one or more sensors sending the context data.

13. The vehicle system of claim 1, wherein the attention demand value is representative of a short-term high attention demand environment.

14. A computer-implemented method comprising:

receiving context data from one or more sensors representative of a vehicle's environment;

determining an attention demand value based on the context data and a workload value corresponding to the context data;

outputting an indicator based upon the determination and suggesting activation or adjustment of an option of a do not disturb communication setting, wherein the do not disturb communication setting inhibits communication to a driver from a device and includes two or more options each corresponding to an individual magnitude of inhibiting the communication;

receiving a request at the vehicle to output a communication; and controlling the communication based on the do not disturb setting.

15. The method of claim 14, wherein the one or more sensors includes a transceiver in communication with an off-board server.

16. The method of claim 14, wherein the two or more options include delaying, ignoring, or outputting an incoming communication to an occupant based on a different type of communication.

17. A vehicle system (VS), comprising:

a vehicle sensor generating data related to a vehicle's environment; and a processor in the VS receiving a signal from the sensor, the processor programmed and configured to:

determine an attention demand value utilizing the signal; and output an indicator based on the determination and suggesting user-adjustment of a setting of a communication feature, the setting corresponding to a magnitude of inhibiting communication from a device.

18. The vehicle system of claim 17, wherein the signal is data or an analog signal.

19. The vehicle system of claim 17, wherein the processor is further configured to:

determine a long-term workload indicator to compute attention demand for a long-term driving scenario; and output the indicator based on the long-term workload indicator.

20. The vehicle system of claim 17, wherein the indicator suggests adjustment of the communication feature via an audible warning.

* * * * *